United States Patent
Bogdan (10) Patent No.: US 8,208,698 B2
(45) Date of Patent: Jun. 26, 2012

(54) CHARACTERIZING A TEXTURE OF AN IMAGE

(75) Inventor: Alexandru Bogdan, New York, NY (US)

(73) Assignee: MELA Sciences, Inc., Irvington, NY (US)

( * ) Notice: Subject to any disclaimer, the term of this patent is extended or adjusted under 35 U.S.C. 154(b) by 1228 days.

(21) Appl. No.: 11/956,918

(22) Filed: Dec. 14, 2007

(65) Prior Publication Data

US 2009/0154781 A1    Jun. 18, 2009

(51) Int. Cl.
*G06K 9/00* (2006.01)
(52) U.S. Cl. ...................................................... 382/128
(58) Field of Classification Search .................. 382/128; 128/922
See application file for complete search history.

(56) References Cited

U.S. PATENT DOCUMENTS

| | | | |
|---|---|---|---|
| 5,274,715 A | | 12/1993 | Hsu |
| 5,796,407 A | * | 8/1998 | Rebiai et al. ................... 345/586 |
| 5,848,198 A | * | 12/1998 | Penn ............................. 382/276 |
| 5,859,919 A | * | 1/1999 | Holland et al. ................ 382/108 |
| 6,081,612 A | * | 6/2000 | Gutkowicz-Krusin et al. ............................. 382/128 |
| 6,208,749 B1 | * | 3/2001 | Gutkowicz-Krusin et al. ............................. 382/128 |
| 6,274,715 B1 | * | 8/2001 | Or et al. ......................... 536/7.4 |
| 6,442,287 B1 | * | 8/2002 | Jiang et al. .................... 382/128 |
| 6,788,304 B1 | * | 9/2004 | Hart et al. ..................... 345/586 |
| 7,043,063 B1 | * | 5/2006 | Noble et al. .................. 382/128 |
| 2005/0036669 A1 | * | 2/2005 | Takeo et al. ................... 382/128 |
| 2006/0064248 A1 | * | 3/2006 | Saidi et al. ...................... 702/19 |
| 2008/0037853 A1 | * | 2/2008 | Bernard et al. ............... 382/132 |
| 2009/0284589 A1 | * | 11/2009 | Radeva et al. .................. 348/77 |
| 2011/0064287 A1 | | 3/2011 | Bogdan |

FOREIGN PATENT DOCUMENTS

| WO | WO 2009/017483 | 2/2009 |
|---|---|---|
| WO | WO 2011/031820 | 3/2011 |

OTHER PUBLICATIONS

Manousaki et al., Use of Color Texture in Determining the Nature of Melanocytic Skin Lesions—a Qualitative and Quantitative Approach, Jan. 9, 2004, Computers in Biology and Medicine, 36, pp. 419-427.*
Manousaki et al., Use of Color Texture in Determining the Nature of Melanocytic skin lesions—a Qualitative and Quantitative Approach, Computers in Biology and Medicine 36 (2006) 419-427.*
Manousaki et al., Use of Texture in Determining the Nature of Melanocytic Skin Lesions, Jan. 26 2005, Computers in Biology and Medicine, 36, 419-427.*
Aubert et al., Fractal Superlattices and their Wavelet Analyses, Jan. 12 1988, Optics Communications, 149, 207-212.*
Farge et al., Wavelets and Turbulence, Proceedings of the IEEE, 84, 639-669.*
International Preliminary Report on Patentability for App. Ser. No. PCT/US08/86576, mailed Jun. 3, 2010 (11 pages).
International Preliminary Report on Patentability for PCT/US08/86576, dated Apr. 19, 2010 (8 pages).
International Search Report and Written Opinion for PCT/US2010/048208, dated May 30, 2011, 9 pages.

(Continued)

*Primary Examiner* — Jack Berman
*Assistant Examiner* — Jason McCormack
(74) *Attorney, Agent, or Firm* — Fish & Richardson P.C.

(57) ABSTRACT

Among other things, a texture of an image is characterized by deriving lacunarity measures from the image based on a wavelet analysis.

54 Claims, 6 Drawing Sheets

OTHER PUBLICATIONS

Transaction History for U.S. Appl. No. 12/876,549, filed Sep. 7, 2010.
Chhabra et al., "Direct determination of the F(α) singularity spectrum and its application to fully developed turbulence," *Phys. Rev. A.*, 40(9):5824-5294 (1989).
Dougherty et al., "Lacunarity analysis of spatial pattern in ct images of vertebral trabecular bone for assessing osteoporosis," *Elsevier Journal of Medical Engineering & Physics*, 24(2):129-138 (2002).
Friedman et al., "The Diagnostic Performance of Expert Dermoscopists vs a Computer-Vision System on Small-Diameter Melanomas," *Arch. Dermatol.*, 144(4):476-482 (2008).
Jaffard et al., "Wavelet leaders in multifractal analysis," *Wavelet Analysis and Applications*, in Qian et al. Eds., Birkhauser Verlag, 219-264 (2006).
Posadas et al., "Multifractal characterization of the spatial distribution of ulexite in a bolivian salt flat," *International Journal of Remote Sensing*, 26:615-637 (2005).
Shannon, "A mathematical theory of communication," *Bell System Technical Journal*, 27:379-423, 623-656 (1948).
Vehel et al., "Texture and multifractals: new tools for image analysis," *Technical Report 1706*, INRIA (1992).
Wighton et al., "Existence and perception of textural information predictive of atypical nevi: preliminary insights," in *Medical Imaging 2008: Image Perception, Observer Performance, and Technology Assessment, Ser. Proceedings of the SPIE*, 6917 (Apr. 2008).
Wikipedia, "Information theory—Wikipedia, the free encyclopedia." NewValue0, 2009 [online]. [retrieved on Apr. 21, 2009.] Retrieved from Internet: <URL:http://en.wikipedia.org/w/index.php?title=Information_theory&printable=yes, 16 pages.
Application, pending claims and Transaction History for U.S. Appl. No. 12/876,549, filed Sep. 7, 2010.
International Search Report for PCT/US08/86576, dated Feb. 5, 2009.
Manousaki et al., "Use of color texture in determining the nature of melanocytic skin lesions—a qualitative and quantitative approach," *Computers in Biology and Medicine*, 36:419-427 (2006).
Zaia et al., "MR Imaging and Osteoporosis: Fractal Lacunarity Analysis of Trabecular Bone," *IEEE Transactions of Information Technology in Biomedicine*, 10(3):484-489 (2006).
Breiman, Leo, *Random Forests*, pp. 1-33 (2001).
Daubechies, Ingrid, "Orthonormal Bases of Compactly Supported Wavelets," *Communications on Pure and Applied Mathematics*, XLI:909-996 (1988).
Einstein et al., "Self-Affinity and Lacunarity of Chromatin Texture in Benign and Malignant Breast Epithelial Cell Nuclei," *Physical Review Letters*, 80(2):397-400 (1998).
'Fractal—Wikipedia, the free encyclopedia'. [online]. [retrieved on Dec. 14, 2007]. Retrieved from Internet:<URL:http://en.wikipedia.org/wiki/Fractal>.
Guyon et al., *An Introduction to Feature Extraction*, Chapter 1, pp. 29-64 (2006).
Hwang and Mallat, "Characterization of Self-Similar Multifractals with Wavelet Maxima," *Technical Report 641* pp. 1-25 (1993).
Laksari et al., "Lacunarity of Fractal Superlattices: A Remote Estimation Using Wavelets," *IEEE Transactions on Antennas and Propagation*, 55(4):1358-1363 (2005).
Levy Vehel et al., *Texture and Multifractals: New Tools for Image Analysis*, pp. 1-29 (1992).
Mallat and Hwang, "Singularity Detection and Processing with Wavelets," *IEEE Transactions on Information Theory*, 38(2):617-643 (1992).
Mallat and Zhong, *Wavelet Maxima Representation*, 207-284 (Courant Institute of Mathematical Sciences, New York) pp. 206-284 (1992).
Mallat and Zhong, "Characterization of Signals from Multiscale Edges," *IEEE Transactions on Pattern Analysis and Machine Intelligence*, 14(7):710-732 (1992).
Mallat, Stephane, "A Theory for Multiresolution Signal Decomposition: The Wavelet Representation," *IEEE Transactions on Pattern Analysis and Machine Intelligence*, 11(7):674-693 (1989).
Mallat, Stéphane, *A Wavelet Tour of Signal Processing*, Chapter 6, pp. 227-297 (1998).
Mandelbrot, Benoit, *The Fractal Geometry of Nature*, (W.H. Freeman and Company, San Francisco), Chapter 34: Texture: Gaps and Lacunarity; Cirri and Succolarity, pp. 310-318 (1977).
Marghoob et al. *Atlas of Dermoscopy*, Chapter 3, p. 13-21(2005).
Negron et al., "Dermoscopy and beyond: the instruments. The evolution from the dermoscope to computer analysis of dermoscopic images", pp. 13-21, (2005).
Nottale, Laurent, *Fractal Space-Time and Microphysics: Towards a Theory of Scale Relativity*, Chapter 3: From Fractal Objects to Fractal Spaces, pp. 33-88 (World Scientific, Singapore) (1993).
Peitgen and Saupe, *The Science of Fractal Images*, (Springer-Verlag, New York) Chapter 1: Fractals in nature: From characterization to simulation, pp. 21-70 (1988).
Rao et al., "LungCAD: A Clinically Approved, Machine Learning System for Lung Cancer Detection," *Industrial and Government Track Short Paper*, 1033-1037 (2007).
Rodrigues et al., "A self-referred approach to lacunarity," pp. 1-4 (2004).
Sun et al., "Fractal Analysis of Remotely Sensed Images: A review of methods and applications," *International Journal of Remote Sensing*, 27(22): pp. 4963-4990 (2006).

\* cited by examiner

CHARACTERIZING A TEXTURE OF AN IMAGE

BACKGROUND

This application relates to characterizing a texture of an image.

Melanoma is the deadliest form of skin cancer and the number of reported cases is rising steeply every year. In state of the art diagnosis, the dermatologist uses a dermoscope which can be characterized as a handheld microscope. Recently image capture capability and digital processing systems have been added to the field of dermoscopy as described, for example, in Ashfaq A. Marghoob MD, Ralph P. Brown MD, and Alfred W Kopf MD MS, editors. Atlas of Dermoscopy. The Encyclopedia of Visual Medicine. Taylor & Francis, 2005. The biomedical image processing field is moving from just visualization to automatic parameter estimation and machine learning based automatic diagnosis systems such as Electro-Optical Sciences' MelaFind, D. Gutkowicz-Krusin, M. Elbaum, M. Greenebaum, A. Jacobs, and A. Bogdan. System and methods for the multispectral imaging and characterization of skin tissue, 2001. U.S. Pat. No. 6,081,612, and R. Bharat Rao, Jinbo Bi, Glenn Fung, Marcos Salganicoff, Nancy Obuchowski, and David Naidich. LungCad: a clinically approved, machine learning system for lung cancer detection. In KDD (Knowledge Discovery and Data Mining) '07: Proceedings of the 13th ACM SIGKDD international conference on Knowledge discovery and data mining, pages 1033-1037, New York, N.Y., USA, 2007. ACM. These systems use various texture parameter estimation methods applied to medical images obtained with a variety of detectors.

A relatively recent class of texture parameters (features or descriptors in machine learning jargon) was inspired by Fractal Geometry. It was introduced by B. B. Mandelbrot. The Fractal Geometry of Nature. Freeman, San Francisco, Calif., 1983. as a mathematical tool to deal with signals that did not fit the conventional framework where they could be approximated by a set of functions with a controlled degree of smoothness. It can describe natural phenomena such as the irregular shape of a mountain, stock market data or the appearance of a cloud. Medical data is a good example of signals with fractal characteristics. Sample applications of fractal analysis include cancer detection, for example, as described in Andrew J. Einstein, Hai-Shan Wu, and Joan Gil. Self-affinity and lacunarity of chromatin texture in benign and malignant breast epithelial cell nuclei. Phys. Rev. Lett., 80(2):397-400, January 1998, remote sensing, for example, introduced in W. Sun, G. Xu, and S. Liang. Fractal analysis of remotely sensed images: A review of methods and applications. International Journal of Remote Sensing, 27(22), November 2006, and others, for example, Wikipedia. Fractal—wikipedia, the free encyclopedia, 2007.

In signal processing, the Wavelet Transform is often described as a space-scale localized alternative to the Fourier Transform. Wavelet maxima extract the relevant information from the wavelet representation. The space-scale localization property makes wavelets and wavelet maxima a natural tool for the estimation of fractal parameters as described, for example, in Heinz-Otto Peitgen and Dietmar Saupe, editors. The Science of Fractal Images. Springer Verlag, 1988, and Laurent. Nottale. Fractal Space-Time and Microphysics: Towards a Theory of Scale Relativity. World Scientific, 1992, and S. Mallat. A theory for multiresolution signal decomposition: the wavelet representation. 11(7):674-693, July 1989, and Stephane Mallat. A Wavelet Tour of Signal Processing. Academic Press, 1999.

SUMMARY

In general, in an aspect, a texture in an image is characterized by deriving lacunarity measures from the image based on a wavelet analysis.

Implementations may include one or more of the following features. The image comprises a multispectral image. The image comprises an image of a biological tissue. The wavelet analysis is based on a wavelet maxima representation of a gray scale image. The image comprises an analysis region having a skin lesion. Automatic segmentation is applied to create a mask of the lesion. The lacunarity measures are derived at least in part based on a gliding box method. The gliding box method uses a window of fixed characteristic size R.

The window comprises a circular window. The wavelet maxima in the window are counted to generate a distribution of the counts indexed by a wavelet level L. The lacunarity measures are indexed by the wavelet level L and gliding box of fixed characteristic size R. The lacunarity measures are determined as a function of R. The lacunarity measures are tested for separability of classes into which the images are grouped.

These and other aspects and features, and combinations of them, may be phrased as methods, systems, apparatus, program products, means for performing functions, databases, and in other ways.

Other advantages and features will become apparent from the following description and the claims.

DESCRIPTION

A method for the fractal characterization of textures (e.g., textured regions) in biological images, with application, for example, to medical imaging and diagnosis, uses wavelet maxima to estimate lacunarity measures from multispectral images. These estimates are used to generate attributes (features) which enter a classification system. The algorithms have been tested on data from Electro-Optical Sciences' MelaFind skin cancer diagnostic image database.

The estimation of lacunarity is usually used together with the fractal dimension as a complete set of fractal texture parameters. The wavelet maxima representation (WMR) has been used for the estimation of fractal self-similarity dimension, for example, in Stephane Mallat's work, and of lacunarity of one dimensional signals in J.Y Laksari, H. Aubert, D. L. Jaggard, and J. Y. Toumeret. Lacunarity of fractal superlattices: a remote estimation using wavelets. IEEE Transactions on Antennas and Propagation, 53(4):1358-1363, April 2005. Extension to two-dimensional signals requires building a WMR skeleton in more than one dimension. The WMR method for the estimation of the self-similarity dimension in images, is shown in the work of D. Gutkowicz-Krusin et al., is extended to compute lacunarity texture parameters from regions of interest of an image. These features are used to build a classifier that separates melanoma from benign lesions using data collected with, for example, the Electro-Optical Sciences' MelaFind system.

Fractals and wavelets share scale as the main concept for signal analysis. The Wavelet Transform provides a signal representation that is localized in both space (time) and scale (frequency). Fractal Analysis finds properties of a signal that are common across a range of scales.

Fractal Texture Analysis

The main properties of a mathematical fractal object are scale-invariance (self-similarity) and translation-invariance (lacunarity). Real data will exhibit these characteristics over finite regions in the scale or space (in the case of images) direction. In pattern recognition, fractal texture characterization is usually implemented by estimating the similarity dimension in an attempt to quantize the scaling behavior. Textures with the same fractal dimension can have different appearances. This difference can be quantized by a complementary parameter called lacunarity. Lacunarity is related to how homogeneous or translation invariant the studied object is.

A mathematical fractal object exhibits strict self-similarity, characterized by the fractal dimension D:

$$D = \frac{lg(N_S)}{lg\left(\frac{1}{S}\right)} \quad (1)$$

where $N_s$ is the number of parts of the fractal object as scaled by s. For real world data, empirical methods are used to estimate the fractal dimension. Moreover the objects are inhomogeneous, which results in having a spectrum of dimensions D (multifractals) over a finite range of scales s. A generic method to estimate the fractal dimension can be summarized in three steps as disclosed in the work of W. Sun et al:

1. Measure a property of interest for the studied object using different step sizes.
2. Plot log(measurements) versus log(step size) and fit a regression line to the data.
3. The slope of the regression line is used to derive D.

Fractal modeling is used in image and pattern recognition applications to describe textures and segment objects J. Levy Vehel, P. Mignot, and J. P. Berroir. Multifractals, texture, and image analysis. pages 661-664, 1992.

Lacunarity

Lacunarity is usually estimated from the raw signal, thresholded using some meaningful algorithm to generate binary images. Then a gliding box method is used to build a distribution of points in the box as a function of box size. As an example, as described in the work of Andrew J. Einstein et al, gray images of cancerous cells are thresholded at the first quartile of the intensity histogram. A square box of side size R is moved pixel by pixel in the image region of interest. A probability distribution $Q_R(N)$ having N points in a box of size R is generated this way. The ratio of a measure of dispersion over the center of the distribution is a popular estimate for lacunarity. In practice, a widely used estimate is the ratio of the second moment to the square of the first:

$$\Lambda(R) = Z_Q^{(2)}/(Z_Q^{(1)})^2,$$

where $Z_Q^{(i)}$ is the $i^{th}$ moment of Q(N). Lacunarity captures the change in $\Lambda(R)$ as the box size R changes. The slope of the linear approximation of the lg($\Lambda$(R)) vs lg(R) is the lacunarity measure.

The Wavelet Maxima Representation

The Wavelet Transform is a relatively new mathematical tool introduced in Ingrid Daubechies. Orthonormal bases of compactly supported wavelets. 41:909-996, 1988, that can be used to selectively enhance and quantify clinically relevant information in a biological image while suppressing the noisy background. The information in a signal is determined by changes in that signal. As an example, in an image, we find the information by looking at the variation of pixel intensity. Wavelets measure signal variation locally at different scales. In a one dimensional signal, wavelets provide a time-frequency representation or an alternative to the short time Fourier Transform.

The Continuous Wavelet Transform (CWT) is a set of image approximations (fine- to coarse-scale) obtained from the analysis (inner products) of the original f(x) with a translated, scaled versions of a "mother wavelet" $\psi(x)$:

$$Wf_{\alpha\tau} = f * \psi = \frac{1}{\sqrt{a}} \int f(x)\psi\left(\frac{x-\tau}{a}\right)dx, \quad (2)$$

where the wavelet representation $Wf_{\alpha\tau}$ of $f$ is indexed by position $\tau$ and the scale index (dilation) $\alpha$. Admissibility conditions for the mother wavelet $\psi(x)$ as required by the desired properties of $Wf_{\alpha\tau}$ have been well studied and understood, for example, in the work of Stephane Mallat et al. The CWT representation has the translation and rotation invariance pattern recognition desired properties but is extremely redundant and results in an explosion of data.

The Wavelet Maxima Representation (WMR) was introduced in W. L. Hwang and S. Mallat. Characterization of self-similar multifractals with wavelet maxima. Technical Report 641, Courant Institute of Mathematical Sciences, New York University, July 1993. to study the properties of transient signals. Most of the information resides in the variations of the signal. The WMR representation keeps only the position and amplitude of the local maxima of the modulus of the CWT. Local singularities can then be characterized from the WMR decay as a function of scale. In image analysis, large signal variations usually correspond to edges, while small and medium variations are associated with texture. In two-dimensional signals, such as an image f(x,y), WMR is obtained from the one-dimensional CWT, applied to each of the image coordinates. Modulus and argument functions are created:

$$Mf_\alpha(x,y) = \sqrt{|Wf_\alpha^x(x,y)|^2 + |Wf_\alpha^y(x,y)|^2}, \quad (3)$$

$$Af(x,y) = \arctan(Wf_\alpha^y(x,y)/W_\alpha^x(x,y)) \quad (4)$$

The local maxima of $Mf_\alpha(x,y)$ (3) are extracted using the phase information (4).

We can considerably reduce the data load by using the wavelet-maxima representation (WMR) as introduced in S. Mallat and S. Zhong. Characterization of signals from multiscale edges. 14:710-732, 1992. and in S. Mallat and S. Zhong. Wavelet maxima representation. In Yves Meyer, editor, Wavelets and applications, pages 207-284. Springer-Verlag, 1992, which keeps only those coefficients of the CWT that characterize singularities locally. The WMR was used for image coding and de-noising, the estimation of the similarity dimension to describe fractal signals in one dimension as proposed in, for example, the work of S. Mallat and J. Y. Laksar and et al. and to estimate a global similarity dimension from digital images, as described by D. Gutkowicz-Krusin and et al.

Fractal Features from the Wavelet Maxima Representation

In one-dimensional signals the similarity dimension D and lacunarity A are estimated from the WMR skeletons, as described, for example, in S. Mallat and W. L. Hwang. Singularity detection and processing with wavelets. 38(2):617-644, March 1992, and in the work of J. Y. Laksari et al.

The Similarity Dimension

For two dimensional signals such as images, we estimate the fractal features from the WMR counts in boxes of various sizes. The generic algorithm uses a gliding box over the WMR representation of an image. At each wavelet level L, we use a sliding window of size R over the region and obtain the WMR counts for each position. For fixed L and R we obtain a distribution of counts $Q_{L,R}(N)$ where N is the WMR count inside the window. To generate features based on the fractal dimension, for each sliding window, we plot the WMR count as a function of the wavelet level L on a logarithmic scale. The slope of the linear approximation in the log-log plot is an estimate of the local similarity dimension $D_R$. We obtain a distribution of dimensions for each window size R. For fixed R we obtain a distribution of fractal dimension estimates $D_R(N)$, which can be used to generate features based on the similarity dimension.

Lacunarity

These distributions can be used to generate lacunarity based features at a fixed level L (scale). To measure lacunarity, we study the change in $Q_{L,R}(N)$ as a function of box size R for fixed L. We use the ratio of a measure of dispersion over the center of the distribution such as the ratio of the second moment over the square of the first:

$$\Lambda_L(R) = N_Q^{(2)}/(N_Q^{(1)})^2, \quad (5)$$

where $N_Q^{(i)}$ is the $i^{th}$ moment of Q(N). The slope of the linear approximation of the lg($\Lambda$(R)) vs lg(R) is the lacunarity estimate for level L. Other lacunarity estimates are possible such as using the similarity dimension density $D_R(N)$ as the measure of homogeneity.

Generation of Lacunarity Based Texture Features

We illustrate the generation of lacunarity texture features from observations in the MelaFind database of multispectral images. Each observation is represented by 10 gray intensity images obtained from imaging with narrow band colored light ranging from blue to infrared. Our set consists of 322 positive (melanoma) and 1991 negative (benign) examples as determined by pathology.

Figure 1:
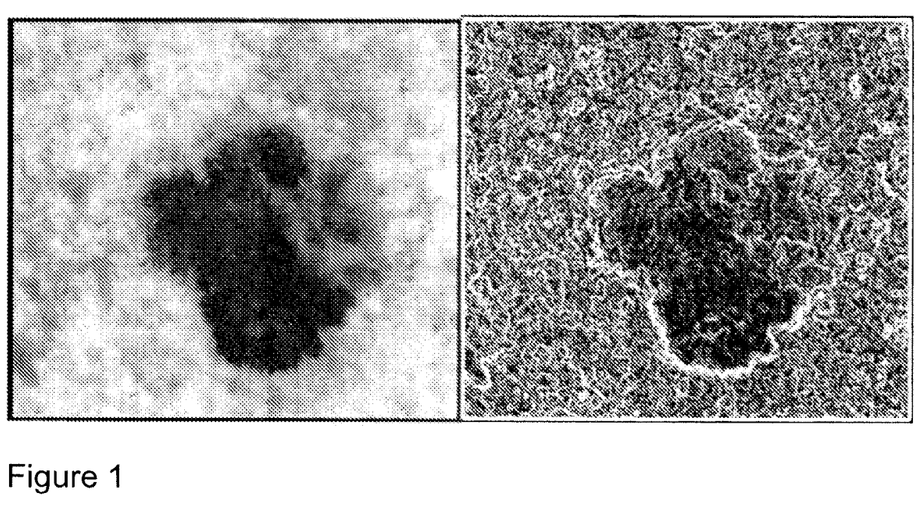
FIG. 1 shows intensity and CWT modulus $Mf_a(x,y)$ images for the blue spectral band, level 2 image of a malignant lesion. Bright pixels correspond to the points of large variation.
Figure 2:
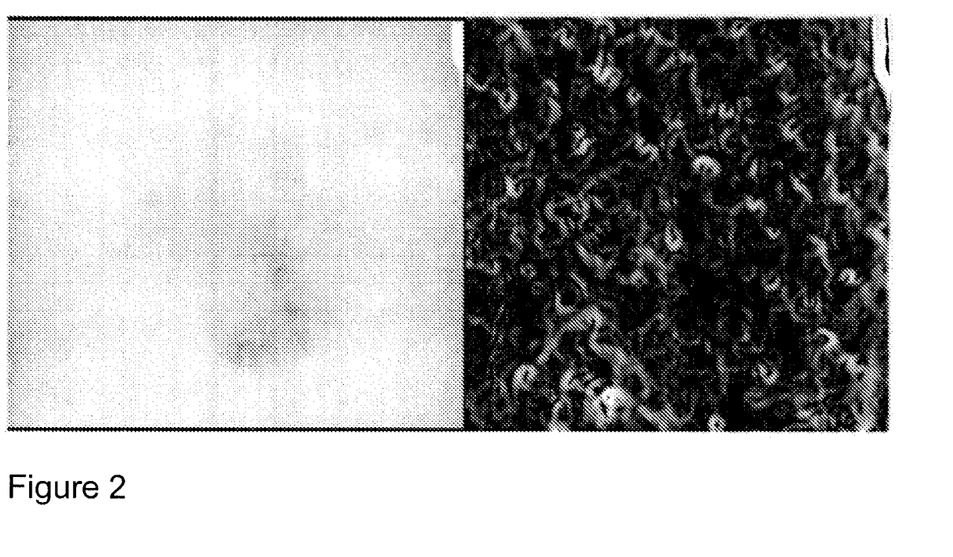
FIG. 2 shows intensity and CWT modulus $Mf_a(x,y)$ images for the infrared spectral band image of a malignant lesion. Bright pixels correspond to the points of large variation.
Figure 3:
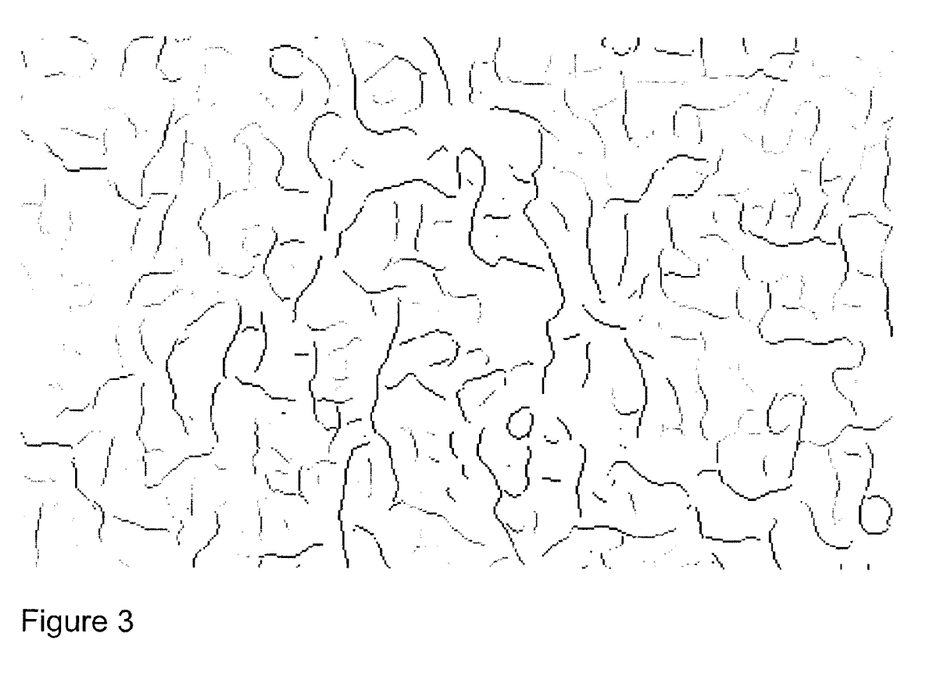
FIG. 3 is a zoom on the WMR level 3 positions for the infrared image of FIG. 2.

The wavelet maxima representation for each individual image is computed using a mother wavelet which approximates the first derivative of a Gaussian introduced by S. Mallet, 1999, resulting in a dyadic ($a=2^j$, $j=1, 2, \ldots$) multi-resolution representation. A sample image of the blue band intensity and modulus maxima at level j=3, (FIG. 1) and infrared, (FIG. 2), are shown together with a map of the WMR positions (FIG. 3) on a section of FIG. 2.

Figure 4:
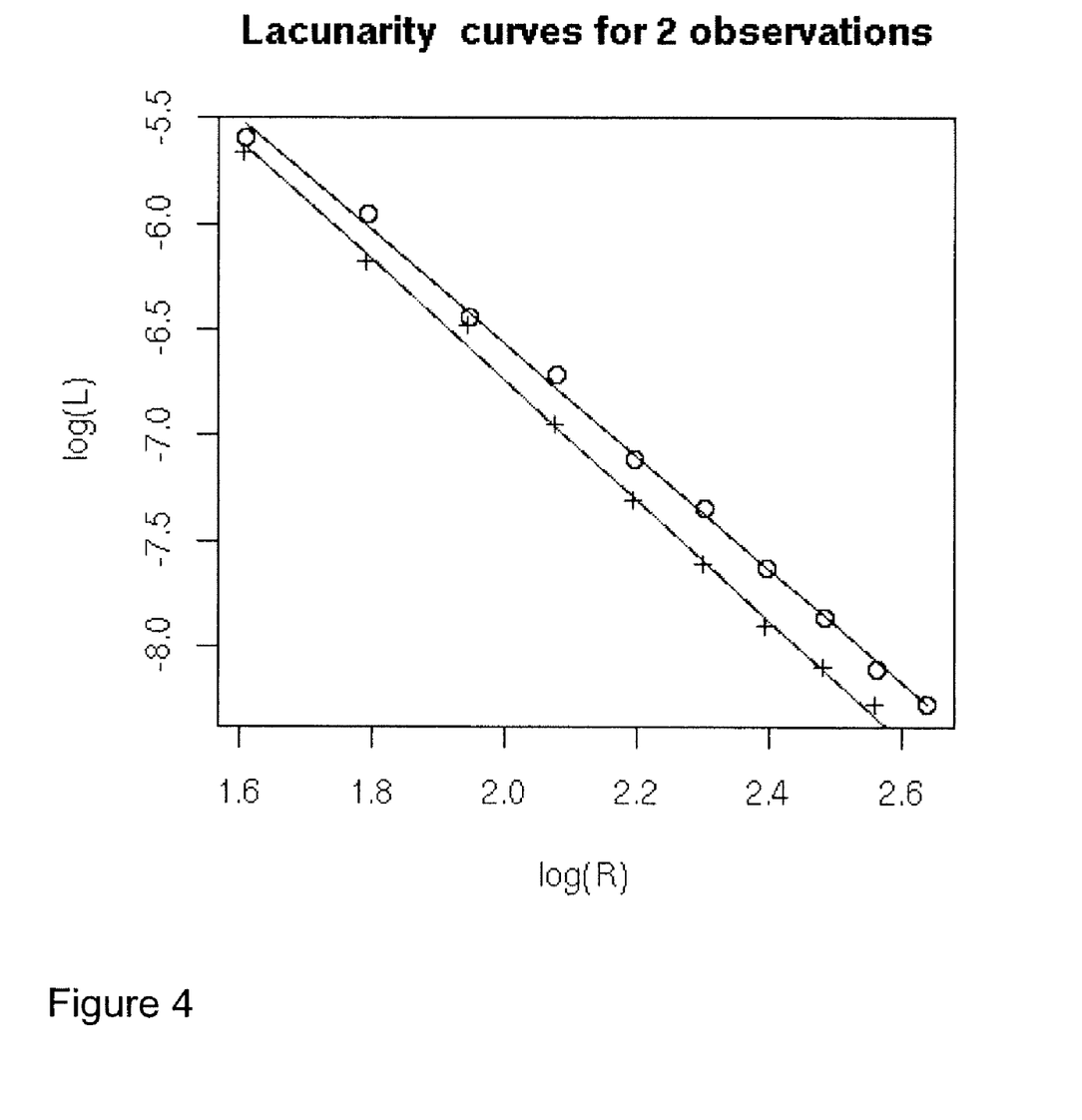
FIG. 4 shows lacunarity plots and linear approximations for 2 observations, one positive (o) and negative (+).

To estimate lacunarity we look only at the WMR positions inside the lesion, as determined by a binary mask (not shown). Using the gliding box method, slide a circular window of radius $R \in \{r, r+1, \ldots, r+n\}$ over the mask such that the window always stays inside the mask to avoid border and object position related artifacts, as described, for example, in Erbe P. Rodriguez, Marconi S. Barbosa, and Luciano da F. Costa. A self-referenced approach to lacunarity. Phys. Rev. E, 1(2), July 2004. Generate the distribution of WMR counts $Q_{L,R}(N)$ indexed by the wavelet level L and sliding window size R. From the lacunarity values log($\Lambda$(R)) (eq:5) versus log(R) we find the slope and intercept of the regression line, which are used as parameters for texture description. FIG. 4 shows such plots for two observations, one positive and one negative.

Figure 5:
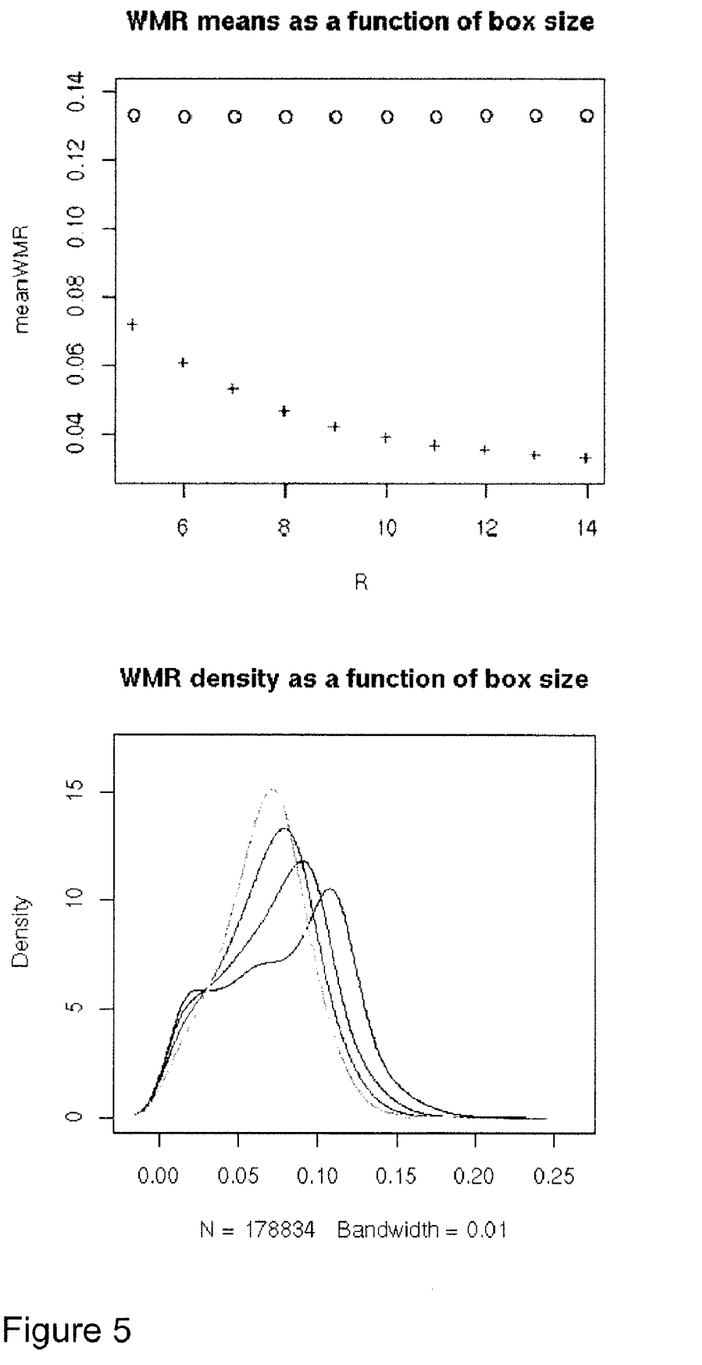
FIG. 5 shows a mean of the distribution of WMR densities observed in FIG. 2 as a function of the gliding box size: "o" wavelet level 2, "x" level 3, "+" level 4; and probability density functions for WMR level 3, box sizes 5 to 10, from which data for the graph on top was extracted.
Figure 6:
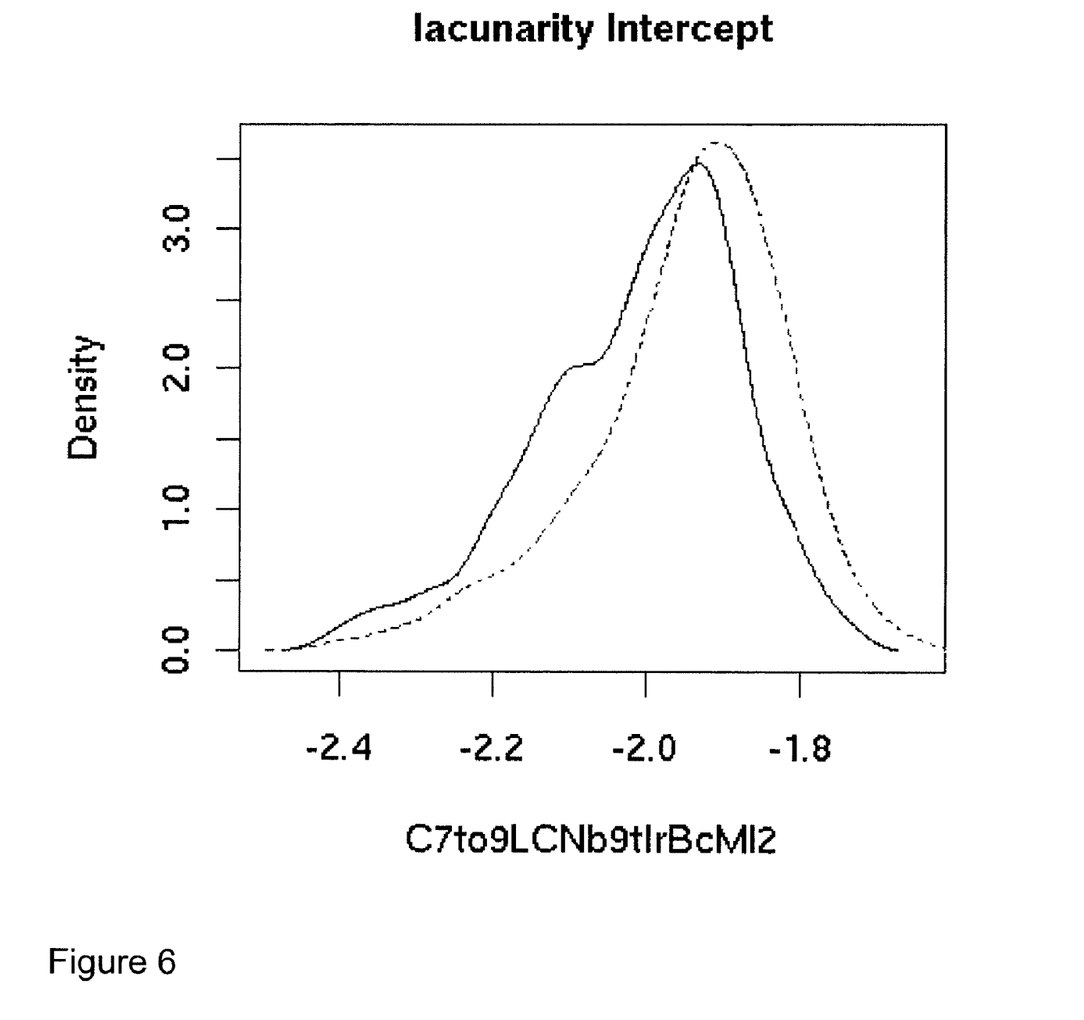
FIG. 6 shows probability density estimates for feature C7to 9LCNb9tIrBcMl2 [spectral band 9 (infrared), wavelet level 2, box sizes 7-9, intercept] of (black) malignant, (dotted_red) benign lesion observations in the Melafind test set.

Another set of measures we use to generate texture descriptors is based on WMR density. When we normalize by the number of pixels in the gliding box we obtain a probability distribution of WMR densities $Q_{L,R}(\rho)$ and lacunarity is estimated from the parameters of this distribution. The example in FIG. 5 (top) shows the variation of $mean_L$,R(N) as the size of the gliding box R changes, with a sample of $Q_{L,R}(\rho)$ for R=5, 6, . . . , 10. Because WMR density $\rho$ is normalized by the size of the gliding box R it can be used alone as texture descriptor, parametrized by the wavelet level L and box size R.

Classification Results

To evaluate the suitability of the lacunarity texture descriptors defined in the previous sections for pattern recognition, we train a Support Vector Machines (SVM) classifier as introduced, for example, in Isabelle Guyon, Steve Gunn, Massoud Nikravesh, and Lotfi Zadeh, editors. Feature Extraction, Foundations and Applications. Springer-Verlag, 2006. on the MelaFind data set, using a subset of these features. We generate approx 5000 features based on the wavelet maxima probability densities $Q_{L,R}(\rho)$. These include $mean_{L,R}(\rho)$, $sd_{L,R}(\rho)/mean_{L,R}(\rho)$ and the slope and intercepts from log-log lacunarity plots based on $\rho$. Because the plots in FIG. 5 exhibit nonlinear behavior, we generate slope and intercept texture descriptors on bounded regions for R such as 5 to 9 pixels and 10 to 14 pixels.

The number of features is reduced to 9 using the Random Forests [described in Leo Breiman. Random forests. Machine Learning, 45(1):5-32, 2001.] capability to rate variables. Random forest is a classifier that consists of many decision trees but is also used to find variable (feature) importance. The main criteria for rating we use are the Gini importance and the out-of-bag (oob) error estimates. FIG. 4 shows the probability distributions by class for one of the 9 selected features.

In applications such as cancer detection it is usual to have asymmetric data, for example, in our case a 6/1 ratio of positive to negative observations. The miss classification cost is also asymmetric, the cost of missing a melanoma being much higher than missing a benign lesion. The cost function used in training the classifier aims to achieve sensitivity $S_e$=100% (sensitivity being the percentage of correct classified positive observations) and maximize the number of correctly classified negative observations. The SVM classifier trained with 5-fold cross-validation achieves the performance described in Table 1 below. This is a good result for this type of data and application and considering that only lacunarity features are used in the classifier.

TABLE I

SVM CLASSIFIER WITH RBF KERNEL, 9 FEATURES, 5-FOLD CROSS-VALIDATION.

| Classified | Positive Observations | Negatives Observations |
|---|---|---|
| Positive | 322 | 1082 |
| Negative | 0 | 909 |
| Correct Percent | 100% | 45% |

The techniques described here can be implemented in a variety of ways using hardware, software, firmware, or a combination of them to process image data and produce intermediate results about lacunarity, texture, and other features, or final results that distinguish melanoma from benign lesions.

Other implementations of the method described here are also within the scope of the following claims.

The invention claimed is:

1. A machine-based method comprising:
    analyzing wavelet maxima in a wavelet maxima representation of an image; and
    characterizing a texture of the image by deriving lacunarity measures based on the analysis of the wavelet maxima.

2. The method of claim 1 in which the image comprises a multispectral image.

3. The method of claim 2 in which the image comprises an image of a biological tissue.

4. The method of claim 1 in which the image is a gray scale image and the method also including computing the wavelet maxima representation for the gray scale image.

5. The method of claim 1 in which the image comprises an analysis region having a skin lesion.

6. The method of claim 5 also including applying automatic segmentation to create a mask of the lesion.

7. The method of claim 1 in which the lacunarity measures are derived at least in part based on a gliding box method.

8. The method of claim 7 in which the gliding box method uses a window of fixed characteristic size R.

9. The method of claim 8 in which the window comprises a circular window.

10. The method of claim 8 in which analyzing the wavelet maxima comprises counting the wavelet maxima in the window to generate a distribution of the counts indexed by a wavelet level L.

11. The method of claim 10 in which the lacunarity measures are indexed by the wavelet level L and the window of fixed characteristic size R.

12. The method of claim 8 in which the lacunarity measures are determined as a function of R.

13. The method of claim 1 also including testing the lacunarity measures for separability classes in which images are grouped.

14. The method of claim 6 in which the lacunarity measures are derived at least in part based on a gliding box method using a window of fixed characteristic size R, the window being inside the mask without extending beyond borders of the mask.

15. The method of claim 8 in which analyzing the wavelet maxima comprises computing a probability distribution of a density of the wavelet maxima in the wavelet maxima representation of the image.

16. The method of claim 15 in which the lacunarity measures are derived based on a change in the probability distribution of the density of the wavelet maxima as a function of R.

17. The method of claim 15 also including computing additional probability distributions of the density of wavelet maxima in the wavelet maxima representation using windows having different characteristic sizes and normalizing all computed probability distributions.

18. The method of claim 10 also including estimating a local similarity in the image by plotting the wavelet maxima counts as a function of the wavelet level L on a logarithmic scale.

19. A non-transitory computer-readable medium having encoded thereon instructions for performing operations comprising:
    analyzing wavelet maxima in a wavelet maxima representation of an image; and
    characterizing a texture of the image by deriving lacunarity measures based on the analysis of the wavelet maxima.

20. The non-transitory computer-readable medium of claim 19 in which the image comprises a multispectral image.

21. The non-transitory computer-readable medium of claim 20 in which the image comprises an image of a biological tissue.

22. The non-transitory computer-readable medium of claim 19 in which the image is a gray scale image and operations also including computing the wavelet maxima representation for the gray scale image.

23. The non-transitory computer-readable medium of claim 19 in which the image comprises an analysis region having a skin lesion.

24. The non-transitory computer-readable medium of claim 23 in which the operations also include applying automatic segmentation to create a mask of the lesion.

25. The non-transitory computer-readable medium of claim 19 in which the lacunarity measures are derived at least in part based on a gliding box method.

26. The non-transitory computer-readable medium of claim 25 in which the gliding box method uses a window of fixed characteristic size R.

27. The non-transitory computer-readable medium of claim 26 in which the window comprises a circular window.

28. The non-transitory computer-readable medium of claim 26 in which analyzing the wavelet maxima comprises counting the wavelet maxima in the window to generate a distribution of the counts indexed by a wavelet level L.

29. The non-transitory computer-readable medium of claim 28 in which the lacunarity measures are indexed by the wavelet level L and the window of fixed characteristic size R.

30. The non-transitory computer-readable medium of claim 26 in which the lacunarity measures are determined as a function of R.

31. The non-transitory computer-readable medium of claim 19 in which the operations also include testing the lacunarity measures for separability classes in which the image is grouped.

32. The non-transitory computer-readable medium of claim 24 in which the lacunarity measures are derived at least in part based on a gliding box method using a window of fixed characteristic size R, the window being inside the mask without extending beyond borders of the mask.

33. The non-transitory computer-readable medium of claim 26 in which analyzing the wavelet maxima comprises computing a probability distribution of a density of the wavelet maxima in the wavelet maxima representation of the image.

34. The non-transitory computer-readable medium of claim 33 in which the lacunarity measures are derived based on a change in the probability distribution of the density of the wavelet maxima as a function of R.

35. The non-transitory computer-readable medium of claim 33 in which the operations also include computing additional probability distributions of the density of wavelet maxima in the wavelet maxima representation using windows having different characteristic sizes and normalizing all computed probability distributions.

36. The non-transitory computer-readable medium of claim 28 also including estimating a local similarity in the image by plotting the wavelet maxima counts as a function of the wavelet level L on a logarithmic scale.

37. A machine comprising:
a processor;
a storage device that stores a program for execution by the processor, the program comprising instructions for causing the processor to
analyze wavelet maxima in a wavelet maxima representation of an image; and
characterize a texture of the image by deriving lacunarity measures based on the analysis of the wavelet maxima.

38. The machine of claim 37 in which the image comprises a multispectral image.

39. The machine of claim 38 in which the image comprises an image of a biological tissue.

40. The machine of claim 37 in which the image is a gray scale image and the processor is also caused to compute the wavelet maxima representation for the gray scale image.

41. The machine of claim 37 in which the image comprises an analysis region having a skin lesion.

42. The machine of claim 41 in which the processor is also caused to apply automatic segmentation to create a mask of the lesion.

43. The machine of claim 37 in which the lacunarity measures are derived at least in part based on a gliding box method.

44. The machine of claim 43 in which the gliding box method uses a window of fixed characteristic size R.

45. The machine of claim 44 in which the window comprises a circular window.

46. The machine of claim 44 in which analyzing the wavelet maxima comprises counting the wavelet maxima in the window to generate a distribution of the counts indexed by a wavelet level L.

47. The machine of claim 46 in which the lacunarity measures are indexed by the wavelet level L and the window of fixed characteristic size R.

48. The machine of claim 44 in which the lacunarity measures are determined as a function of R.

49. The machine of claim 37 in which the processor is also caused to test the lacunarity measures for separability classes in which the image is grouped.

50. The machine of claim 42 in which the lacunarity measures are derived at least in part based on a gliding box method using a window of fixed characteristic size R, the window being inside the mask without extending beyond borders of the mask.

51. The machine of claim 44 in which analyzing the wavelet maxima comprises computing a probability distribution of a density of the wavelet maxima in the wavelet maxima representation of the image.

52. The machine of claim 51 in which the lacunarity measures are derived based on a change in the probability distribution of the density of the wavelet maxima as a function of R.

53. The machine of claim 51 in which the processor is also caused to compute additional probability distributions of the density of wavelet maxima in the wavelet maxima representation using windows having different characteristic sizes and to normalize all computed probability distributions.

54. The machine of claim 46 also including estimating a local similarity in the image by plotting the wavelet maxima counts as a function of the wavelet level L on a logarithmic scale.

* * * * *